United States Patent [19]

Nakanishi et al.

[11] Patent Number: 5,160,301
[45] Date of Patent: Nov. 3, 1992

[54] FIBER-REINFORCED RUBBER

[75] Inventors: Yasuyuki Nakanishi; Hiroshi Matsuoka, both of Kobe, Japan

[73] Assignee: Bando Chemical Industries, Ltd., Kobe, Japan

[21] Appl. No.: 697,675

[22] Filed: May 9, 1991

[30] Foreign Application Priority Data

May 15, 1990 [JP] Japan .................................. 2-126336

[51] Int. Cl.$^5$ ............................................... F16G 1/10
[52] U.S. Cl. ....................................... 474/263; 474/268
[58] Field of Search .............................. 474/261-265, 474/268; 156/138-141

[56] References Cited

U.S. PATENT DOCUMENTS

| 1,400,301 | 12/1921 | McClurg . | |
|---|---|---|---|
| 1,442,924 | 1/1923 | Carlisle . | |
| 2,257,649 | 9/1941 | Pierce . | |
| 2,739,090 | 3/1956 | Waugh | 474/263 X |
| 3,538,974 | 11/1970 | Marzocchi | 474/263 X |
| 3,584,516 | 6/1971 | Burpulis . | |
| 4,681,558 | 7/1987 | Rausch | 474/263 X |

FOREIGN PATENT DOCUMENTS

| 0199546 | 7/1988 | European Pat. Off. . | |
| 0244606 | 4/1987 | Fed. Rep. of Germany | 474/263 |

OTHER PUBLICATIONS

Patent Abstracts of Japan, vol. 8, No. 112, May 25, 1984.
Patent Abstracts of Japan, vol. 5, No. 183, Nov. 21, 1981.
Pulvermacher et al., "High Strength Fibers in the Rubber Industry", 36 Kautschuk+Gummi, Kunstoffe, No. 10, Oct. 1983.

Primary Examiner—Thuy M. Bui
Attorney, Agent, or Firm—Wenderoth, Lind & Ponack

[57] ABSTRACT

A rubber structure has a fiber reinforcement embedded therein. The reinforcement is constructed of cylindrically braided cords braided by yarns, where the number of yarns is an even number in a range of four up to eight. Each cylindrically braided cord has a hollow portion extending in the longitudinal direction at the center thereof. The hollow portion has a small diameter.

12 Claims, 2 Drawing Sheets

FIBER-REINFORCED RUBBER

BACKGROUND OF THE INVENTION

The present invention relates to a fiber-reinforced rubber article and more particularly to a reinforcement embedded in a rubber article.

Since high tensile strength plessley, high elasticity, high dimensional stability, and high adhesive strength has been required for rubber in a belt, a tire, and a hose, a reinforcing cord constructed by fibers or a reinforcing canvas has been embedded in the rubber. Generally, cords of twisted yarns are used for the reinforcement. The cords are grouped into all-yarns-twisted cords, half-yarns-twisted cords, or lang lay. The all-yarns-twisted cords are the most popular for reinforcement for a rubber.

However, when the all-yarns-twisted cords are embedded in rubber as reinforcement, monofilaments rub each other at a sharp angle within the all-yarns-twisted cord. Accordingly, the yarn is abraded, broken, or decreased in strength from the rubbed part after a short period of usage. Therefore, the flex fatigue is lowered.

Japanese Patent Application Laying Open Gazette No. 59-19744 proposed a fiber-reinforced rubber, which reinforcement is constructed by half-yarns-twisted cords or lang lay to solve the above problem (flex fatigue).

However, rubber reinforced by half-yarns-twisted cords or lang lay is lowered in elongation and rate of tensile elasticity after the dipping process as compared with rubber reinforced by all-yarns-twisted cords. This results in lower dimensional stability.

Also, since the half-yarns-twisted cords or lang lay are twisted in only one direction, inversion and loosening of the cords is easily caused at an end. This makes the processing of the cord harder. Furthermore, fraying is easily caused in the place where the cord is cut during the processing of the cord.

When the half-yarns-twisted cords or lang lay are used as a reinforcement for an industrial belt, there exists a problem in that only one side of the belt is abraded soon, since the running belt inclines to one side. This inclination is caused by the twist direction of the cords, such as a half-yarns-twisted cord. On the other hand, the Japanese Patent Application Laying Open Gazette No. 56-103008 disclosed a conveyor belt, in which a reinforcement consists of half-yarns-twisted cords of S-twist and half-yarns-twisted cords of Z-twist alternately in order to prevent the uneven abrasion. However, in this case, two kinds of cords (both are half-yarns-twisted cords) are set in a parallel spiral in a belt structure, a total of four places are cut in every pair of two cords, on the right and left sides of the belt. Therefore, the maintainability of the tensile strength is lowered.

On the other hand, a braided cord has been used for various purposes. Particularly, a cylindrically braided cord is superior in flex fatigue due to its constructional characteristics, and it is also superior to a twisted cord in dimensional stability. Therefore, the cylindrically braided cord will improve both the flex fatigue and dimensional stability if ti si used for a reinforcement for a rubber. Further, cylindrically braided cords are superior in processing, since no loosening by inversion at an end of the cord, such as in half-yarns-twisted cords or lang lay, is caused. Therefore, a cut end is not frayed in processing. Furthermore since cylindrically braided cords don't possess the twisted direct on like half-yarns-twisted cords, the industrial belt maintains stable running without inclination and consequently uneven abrasion can be prevented.

However, the above cylindrically braided cord may possess a relatively large hollow inside of the cord. The size of the hollow depends on the number of yarns used for forming the cord. In case a large hollow is formed, the cord becomes flat when it stretches. Thus, the cord still doesn't satisfy the dimensional stability requirement, even though it is better than the twisted cord.

SUMMARY OF THE INVENTION

The object of the present invention is to use a cylindrically braided cord in stead of a twisted cord for a reinforcement, and specify a number of yarns to use so as to provide a rubber structure with high flex fatigue, dimensional stability, and longer service life.

In order to achieve the above objects according to the present invention, the reinforcement embedded in rubber is constructed by a cylindrically braided cord formed by yarns, where the number of yarns is an even number in a range of four up to eight.

DESCRIPTION OF THE PREFERRED EMBODIMENTS

Preferred embodiment will be described below with reference to the accompanying drawings.

Figure 3:
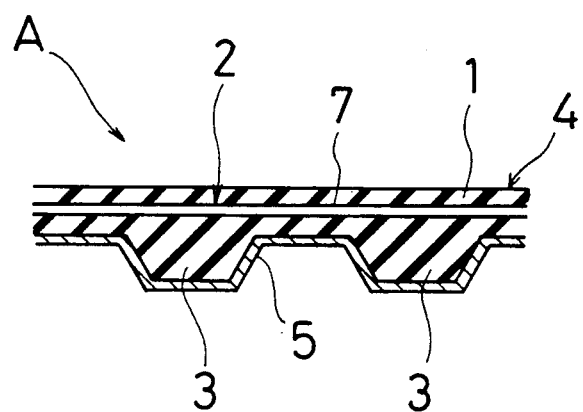
FIG. 3 is an enlarged vertical front section of a synchronous belt.

FIG. 3 illustrates a synchronous belt A as fiber-reinforced rubber. The synchronous belt A comprises a belt base 4 having an elongated rubber layer 1 and a plurality of teeth 3 formed over one side thereon (only two teeth are shown on the lower side of the belt in FIG. 3). The plurality of teeth 3 are made of the same material, rubber, as the rubber layer 1. A fiber reinforcement 2 is embedded in the elongated rubber layer 1 of the belt base 4. A canvas or nylon cloth layer 5 is adhered to the surface of the teeth 3 of the belt base 4.

Figure 1:
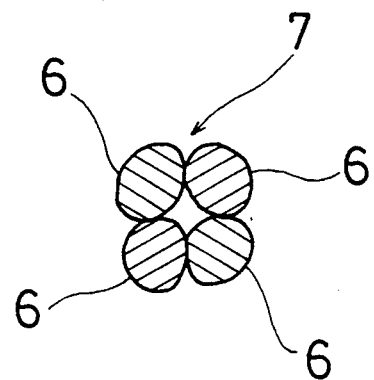
FIG. 1 is an enlarged vertical side section of a cylindrically braided cord.
Figure 2:
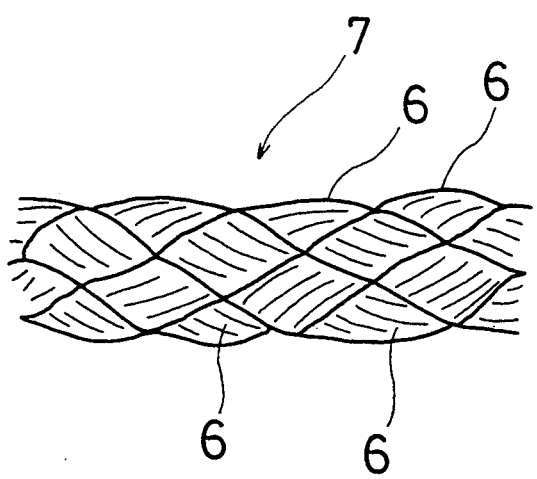
FIG. 2 is an enlarged vertical front section of a cylindrically braided cord.

The present invention is characterized in that the reinforcement 2, as shown enlarged in FIGS. 1 and 2, is constructed by cylindrically braided cords 7 braided by yarns 6, where the number of yarns is an even number in the range of four up to eight (four yarns in the present embodiment).

The yarns 6 may be an inorganic fiber, an organic fiber, or a metallic fiber. Further, a short or long fiber spun yarn a combination thereof those can be used for the yarns 6 according to the required performance of the synchronous belt A. Also, the number of yarns 6 can be any even number if ti is in the range of four up to eight. In order to make a cord of cylindrical configuration, yarns of an even number, and no less than four yarns, are required. That's because an industrial braiding machine cannot make a cord of a cylindrical configuration by using yarns of an odd number when yarns of the same denier number are used. The reason to set the upper limit for the number of yarns, which is eight, is to have either no hollow inside of the cord or a small hollow if one exists. If more than eight yarns are used for a cord, a relatively large hollow is formed and the dimensional stability becomes worse by the flattening of the hollow when the cord is stretched. Also, the total denier number and the number of monfilaments vary according to the required performance of the synchronuos belt A.

The cylindrically braided cord 7 goes through an adhesive process, in which the cord is soaked in an adhesive combined with epoxy resin, isocyanate compound, ethylene urea compound, and resorcing formalin latex (RFL), etc., and a stretching process before it is embedded in the elongated rubber layer 1. dipping process is preferable for the adhesive process in order to soak in the adhesive evenly from the surface of the braided cord 7 to the inside.

The result of a flex fatigue test is shown in Table 1, comparing the above-constructed synchronous belt A with a comparable example. The numerals of Table 1 show the maintainability of the tensile strength of a cylindrically braided cord.

Construction of Synchronous Belt A of Present Embodiment I

Four 1600de (400de×4 and the number of total denier is 6400de) Kevlar (product of Du Pont) yarns are used for the cylindrically braided cords 7 constructing a reinforcement 2. The cylindrically braided cord 7 is dipped into the isoayanate compound so as to form a sub-coat ply, then it is dipped into the adhesive combination liquid of resorcin formalin latex (RFL) so s to form a second-coat ply, it is further dipped into chloroprene rubber so as to form a top-coat ply, and finally it is processed in a stretching process with 1 g/de tension. The synchronous belt A, the reinforcement 2 consisting of a plurality of the cylindrically braided cords 7 embedded on the belt base 4, is obtained by the following steps: a plurality of cylindrically braided cords 7, having finished the stretching process, are spirally wound on the elongated rubber layer 1 of the chloroprene rubber, and the teeth 3 of the chloroprene rubber are formed on the layer 1 so that the cylindrically braided cord 7 is embedded thereon. Thereafter, the nylon cloth 5 is adhered to the surface of teeth 3 and the rubber is cured. The adhesive is soaked evenly from the surface to the inside of the cylindrically braided cord 7 during the adhesive process.

Construction of Synchronous Belt A of Present Embodiment II

Eight 800de (400×2, and the number of total denier is 6400de) Kevlar (product of Du Pont) yarns are used for the cylindrically braided cords 7 constructing a reinforcement 2. Other features are the same as the belt of the present embodiment I.

Construction of Synchronous Belt of Comparable Example

Sixten 400de (400×1 and the number of total denier is 6400de) Kevlar (product of Du Pont) ar used for a cylindrically braided cord 7 construction a reinforcement 2. Other features are the same as the belt of the present embodiment I.

Test on Flex Fatigue

Figure 4:
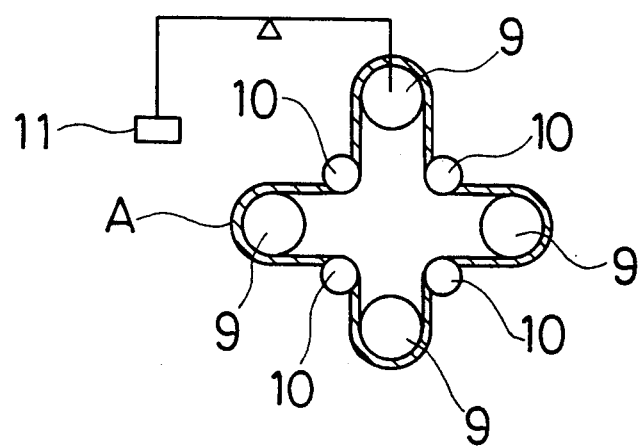
FIG. 4 is an explanatory drawing of a testing system for a flex fatigue.

A test was carried out by the system shown in FIG. 4, where the synchronous belt A is wound around four large pulleys 9 and four small pulleys 10 interposed between the large pulleys 9, and a predetermined tension is applied to the synchronous belt A by a weight 11. The synchronous belt A is run, and the maintainability of tensile strength was measured. The above small pulleys 10 are 30 mm in diameter. One cycle refers to that the synchronous belt A goes through all the four small pulleys 10, i.e., four belt flexes.

TABLE 1

|  | Belt Flex Number | |
|---|---|---|
|  | $1 \times 10^7$ | $1 \times 10^8$ |
| Present Embodiment I | 72.0% | 68.3% |
| Present Embodiment II | 69.2% | 63.9% |
| Comparable Example | 49.1% | 47.0% |

As shown in the test data on table 1, at both $1 \times 10^8$ and $1 \times 10^7$ belt flex number, the maintainability of the tensile strength of the present embodiments I and II are more than 60%. However, the maintainability of plessley of the comparable example is less than 50%. This shows that the present embodiments I and II are superior to the comparable example in the pulling adhesive strength. This results from the fact that flattening of the hollow is hardly caused when the cord is stretched because no hollow, or a very little hollow if it exists, is formed in the cylindrically braided cord 7 in the present embodiments I and II. On the other hand, in the comparable example, a relatively large hollow is formed in the cylindrically braided cord 7. Therefore, the flattening of the hollow is easily caused when the cord is stretched.

In the present embodiments, since the reinforcement 2 embedded in the belt base 4 is constructed by the cylindrically braided cords 7, which are braided by yarns 6, where the number of yarns is an even number in the range of four up to eight, even stress is applied to the monfilaments, which construct the yarns 6 as a constructional characteristic of the cylindrically braided cord 7. Accordingly, flex fatigue can be improved greatly. Also, the dimensional stability of the synchronous belt A can be improved by restricting the flattening of the cords when the cords are stretched. The flattening of the cords is restricted by specifying the number of yarns to make no hollow or a very little hollow, if it exists. Thus, the service life of the synchronous belt A becomes longer.

In the above embodiment, if a center cord is provided in a hollow of the cylindrically braided cord 7, the dimensional stability, in addition to the flex fatigue, will be improved.

Moreover, in the present embodiment, the synchronous belt A is shown as rubber. However, the belt is not limited to the synchronous belt A, but covers an industrial belt such as a conveyor belt and a transmission belt like a flat belt and a ribbed belt. The present invention also can be applied to rubber applications other than belts, for example, tires and hoses.

What is claimed is:

1. A fiber-reinforced rubber article, comprising:
a rubber body portion; and
fiber reinforcement embedded in said rubber body portion, said fiber reinforcement comprising cylindrically braided cords braided by yarns, the number of yarns in each said braided cord being an even number from four to eight, each said cylindrically braided cord having a hollow portion extending in the longitudinal direction of and at the center of said cylindrically braided cord, and said hollow portion having a small diameter.

2. The fiber-reinforced rubber article of claim 1, wherein said yarns of said cylindrically braided cords are made of inorganic fibers.

3. The fiber-reinforced rubber article of claim 1, wherein said yarns of said cylindrically braided cords are made of organic fibers.

4. The fiber-reinforced rubber article of claim 3, wherein said organic fibers are aramid fibers.

5. The fiber-reinforced rubber article of claim 1, wherein said yarns of said cylindrically braided cords are made of metallic fibers.

6. The fiber-reinforced rubber article of claim 1, wherein said yarns of said cylindrically braided cords are long fiber spun yarns.

7. The fiber-reinforced rubber article of claim 1, wherein said yarns of said cylindrically braided cords are short fiber spun yarns.

8. The fiber-reinforced rubber article of claim 1, wherein said rubber article is a power transmission belt.

9. The fiber-reinforced rubber article of claim 1, wherein said power transmission belt is a synchronous belt, and said rubber body portion includes a belt base comprising an elongated rubber layer and a plurality of teeth formed on one side of said elongated rubber layer and made of the same material as said elongated rubber layer, said fiber reinforcement being embedded in said elongated rubber layer.

10. The fiber-reinforced rubber article of claim 1, wherein said rubber article is a conveyor belt.

11. The fiber-reinforced rubber article of claim 1, wherein said rubber article is a tire.

12. The fiber-reinforced rubber article of claim 1, wherein said rubber article is a hose.

* * * * *